(12) United States Patent
Zhang et al.

(10) Patent No.: US 7,136,257 B2
(45) Date of Patent: Nov. 14, 2006

(54) APPARATUS AND METHOD FOR MAINTAINING STABILITY IN A DISC DRIVE SERVO LOOP

(75) Inventors: Tao Zhang, Shakopee, MN (US); John Christopher Morris, Eden Prairie, MN (US); Dustin Mark Cvancara, St. Paul, MN (US); Raye Abdoulie Sosseh, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 245 days.

(21) Appl. No.: 10/439,663

(22) Filed: May 16, 2003

(65) Prior Publication Data

US 2004/0228027 A1    Nov. 18, 2004

(51) Int. Cl.
*G11B 5/596* (2006.01)
(52) U.S. Cl. .................... 360/78.05; 360/78.09
(58) Field of Classification Search ........... 360/78.05, 360/77.17
See application file for complete search history.

(56) References Cited

U.S. PATENT DOCUMENTS

| | | | |
|---|---|---|---|
| 5,155,422 A * | 10/1992 | Sidman et al. ............ 318/560 |
| 5,257,252 A | 10/1993 | Barnes et al. | |
| 5,369,345 A * | 11/1994 | Phan et al. ................. 318/561 |
| 5,444,583 A * | 8/1995 | Ehrlich et al. ........... 360/78.09 |
| 5,774,299 A * | 6/1998 | Baum et al. ............. 360/77.08 |
| 6,204,988 B1 * | 3/2001 | Codilian et al. .............. 360/75 |
| 6,493,172 B1 | 12/2002 | Morris et al. | |
| 6,646,824 B1 * | 11/2003 | Takaishi et al. ......... 360/77.02 |
| 6,741,417 B1 * | 5/2004 | Hsin et al. ............... 360/78.05 |
| 2001/0036034 A1 | 11/2001 | Change et al. | |
| 2001/0036206 A1 | 11/2001 | Jerman et al. | |
| 2001/0040754 A1 | 11/2001 | Heaton et al. | |
| 2002/0101681 A1 | 8/2002 | He et al. | |
| 2002/0114102 A1 | 8/2002 | Takekawa et al. | |
| 2002/0176201 A1 | 11/2002 | Hsin et al. | |

OTHER PUBLICATIONS

Optical recording disc tracking system-imposes quarter-track width radial dither on laser beamot provide quadrature signal and hence radial-directional information, Mar. 20, 1988, Derwent Information LTD, RD 288085A.*
Microsoft Press Computer Dictionary 3rd Ed.*

* cited by examiner

*Primary Examiner*—K. Wong
(74) *Attorney, Agent, or Firm*—David K. Lucente

(57) ABSTRACT

An apparatus and method of maintaining stability in a servo loop of a disc drive is provided. A dither signal (a single frequency sine wave or a multi-frequency signal) is injected into the servo loop. A servo loop gain error signal is obtained in response to the injected dither signal. A gain of the servo loop is adjusted as a function of the servo loop gain error signal in real-time.

20 Claims, 6 Drawing Sheets

APPARATUS AND METHOD FOR MAINTAINING STABILITY IN A DISC DRIVE SERVO LOOP

FIELD OF THE INVENTION

The present invention is related to disc drives. In particular, the present invention is related to disc drive servo control systems.

BACKGROUND OF THE INVENTION

In a computer disc drive, data is stored on discs in concentric tracks.

In disc drives with relatively high track densities, a servo feedback loop is used to maintain a head over the desired track during read or write operations. This is accomplished utilizing prerecorded servo information either on a dedicated servo disc or on sectors that are interspersed along a disc. During track following, the servo information sensed by the head is demodulated to generate a position error signal (PES) which provides an indication of the distance between the head and the track center. The PES is then converted into an actuator control signal, which is used to control an actuator that positions the head.

Historically, only one actuator, typically a voice coil motor (VCM), was used to position the head. Recently, micro-actuators have been proposed that would be used in combination with the VCM to position the head. Such micro-actuators generally have a better frequency response than the VCM. As such, they are better able to follow high frequency control signals. Thus, in disc drives with high storage capacities and densities, such dual-stage actuators are suitable for providing the required high-bandwidth and high-accuracy positioning. In some dual-actuator disc drives, the micro-actuator or second-stage actuator is a piezoelectric micro-actuator that uses piezoelectric elements made of a lead-zirconate-titanate material. Such a micro-actuator system can be referred to as a PZT system.

Ideally, the PZT system of a dual-actuator disc drive will maintain a constant gain during disc drive operation. In practice, however, the temperature of the disc drive fluctuates as a result of the changes in ambient temperature, etc., and therefore the gain of the PZT system, which is sensitive to variations in temperature, also fluctuates. In fact, PZT system gain variations as high as 20–30% have been found to occur during disc drive operation. Such gain variations can degrade the performance of the disc drive and, in some cases, cause intermittent stability problems in the servo loop.

One technique to adjust the micro-actuator gain involves the use of an off-line process to compute and store micro-actuator gain correction data in the disc drive. The data determined from this off-line process is subsequently used to adjust the micro-actuator gain during operation of the disc drive. In this context, an off-line process is one in which the micro-actuator gain correction factors are not determined continuously or in "real-time" during disc drive operation, but instead are determined from a calibration process that is carried out during manufacture of the disc drive. Such an off-line process is complex, time consuming, utilizes storage space in the disc drive and is relatively inaccurate.

Embodiments of the present invention provide solutions to these and other problems, and/or offer other advantages over the prior art.

SUMMARY OF THE INVENTION

The present embodiments relate to disc drive servo loops that employ a gain adjustment scheme that calibrates a gain of the servo loop in real-time, thereby addressing the above-mentioned problems.

An apparatus and method of maintaining stability in a servo loop of a disc drive is provided. A dither signal (a single frequency sine wave or a multi-frequency signal) is injected into the servo loop. A servo loop gain error signal is obtained in response to the injected dither signal. A gain of the servo loop is adjusted as a function of the servo loop gain error signal.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, an apparatus and method are provided for calibrating a gain of a disc drive servo loop in real-time. The real-time gain calibration is carried out by injecting a dither signal into the servo loop and obtaining a servo loop gain error signal in response to the injected dither signal. A gain of the servo loop is adjusted as a function of the servo loop gain error signal.

Figure 1:
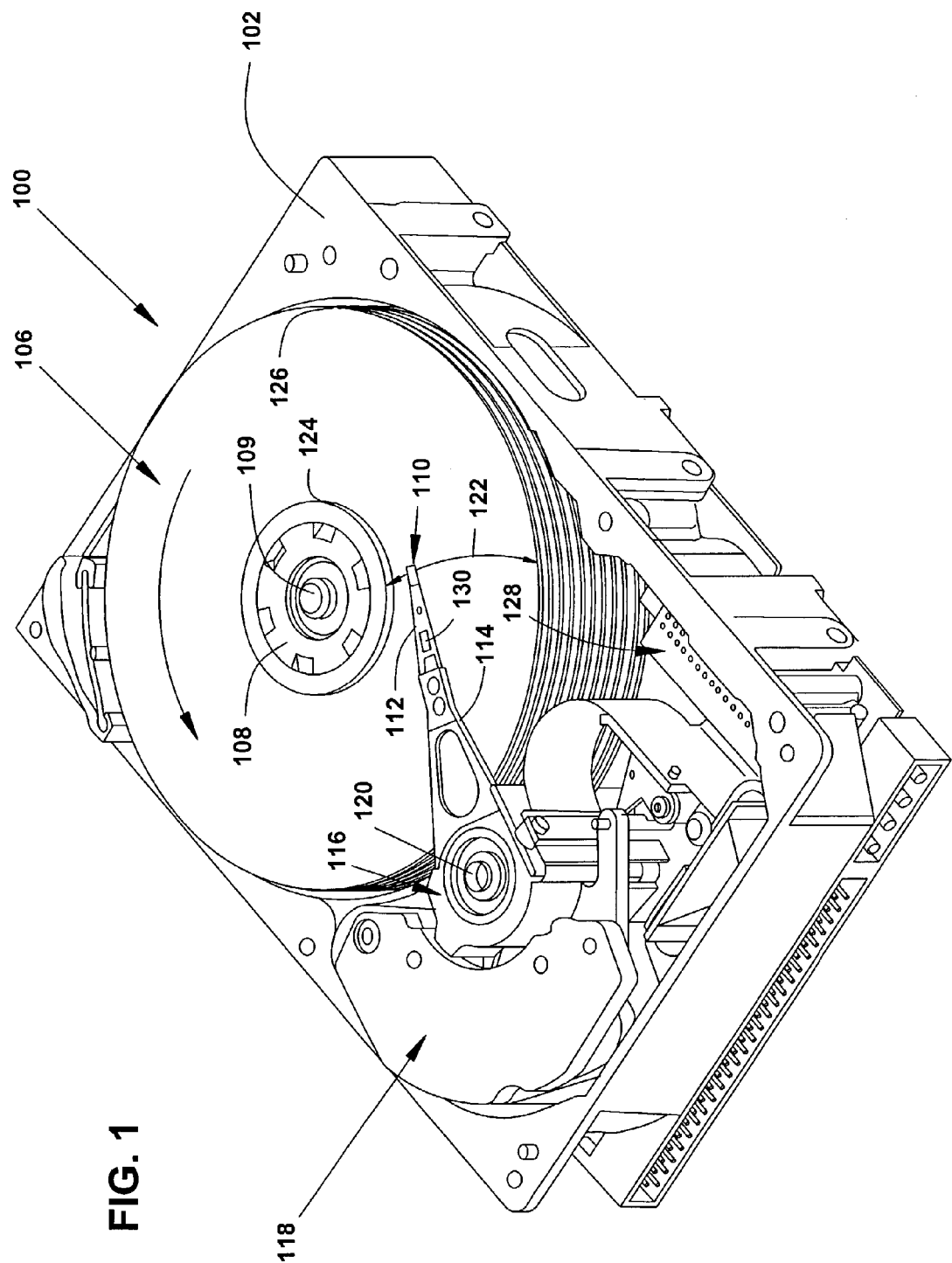
FIG. 1 is a perspective view of a disc drive in which aspects of the present invention may be practiced.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics 128 based on signals generated by heads 110 and a host computer (not shown). A micro-actuator 130, which provides fine position control of heads 110, is used in combination with VCM 118 that provides relatively coarse positioning of heads 110.

Figure 2:
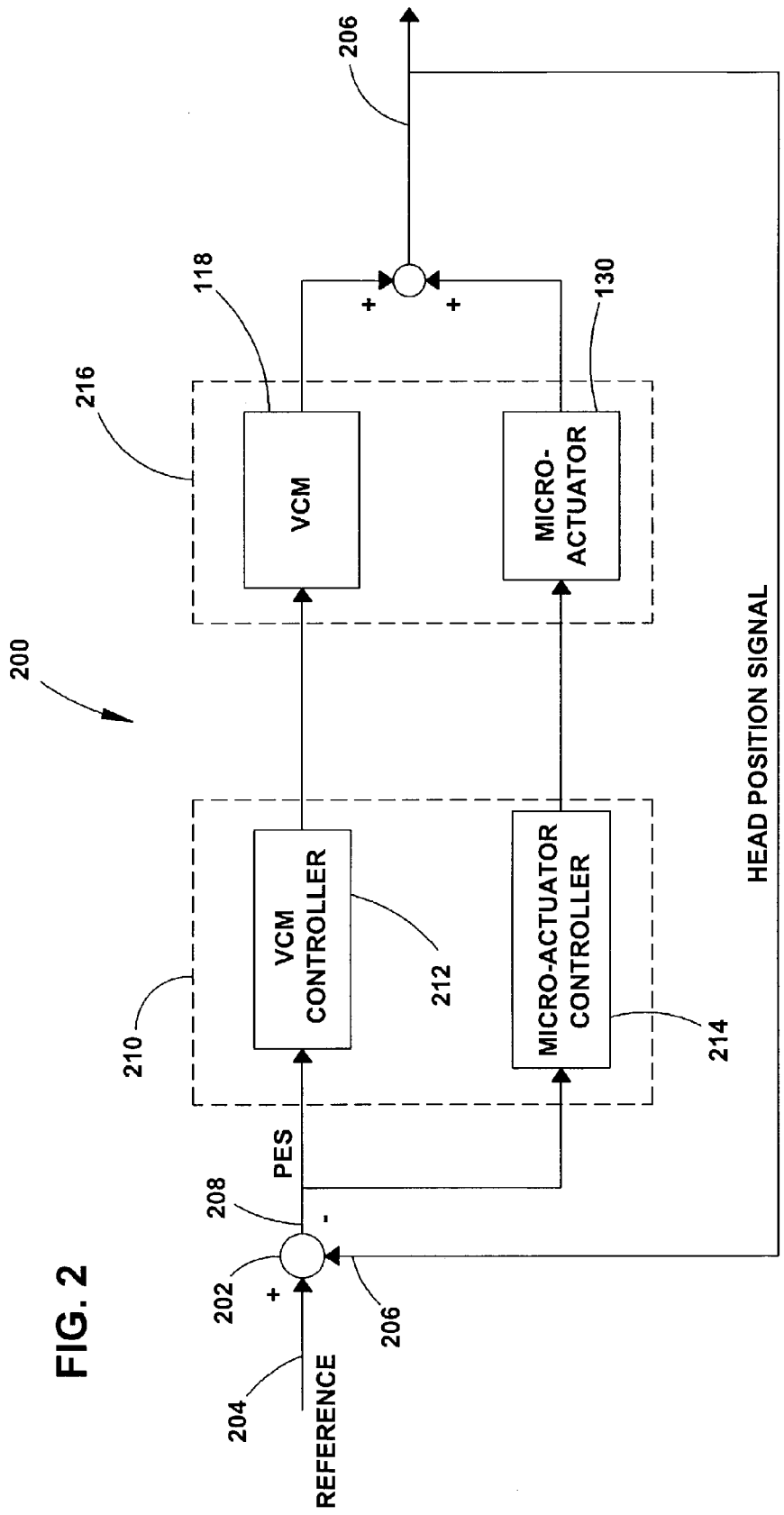
FIG. 2 is a block diagram of a servo loop without real-time gain calibration of the present invention.

Referring now to FIG. 2, a block diagram of a servo loop 200 without a micro-actuator gain calibration module is shown. Components of servo loop 200, other than actuator assembly 216, are included in servo electronics 128 (shown in FIG. 1). Actuator assembly 216 includes VCM 118 and micro-actuator 130. Because the precise structure of the servo loop is not significant to the present invention, servo loop 200 is shown in a simplified form. Those skilled in the art will appreciate that servo loops are more complex than the simple diagram of FIG. 2.

Servo loop 200 includes a summing node 202 that receives a reference signal 204 indicating the desired position for a head on the disc. Summing node 202 combines reference signal 204 with a head position signal 206 to produce a position error signal (PES) 208 that is provided to disc controller 210. Disc controller 210 includes a VCM controller 212 and a micro-actuator controller 214 that each receive PES 208. Based on PES 208, VCM controller 212 generates a VCM control signal that is provided to VCM 118 of actuator assembly 216. Similarly, micro-actuator controller 214 generates a micro-actuator control signal that is provided to micro-actuator 130 of actuator assembly 216.

The control signals cause VCM 118 and micro-actuator 220 to move, thereby changing the position of the head over the disc. Specifically, the movement of the head is the sum of the head movement caused by the VCM and the head movement caused by the micro-actuator.

Figure 3:
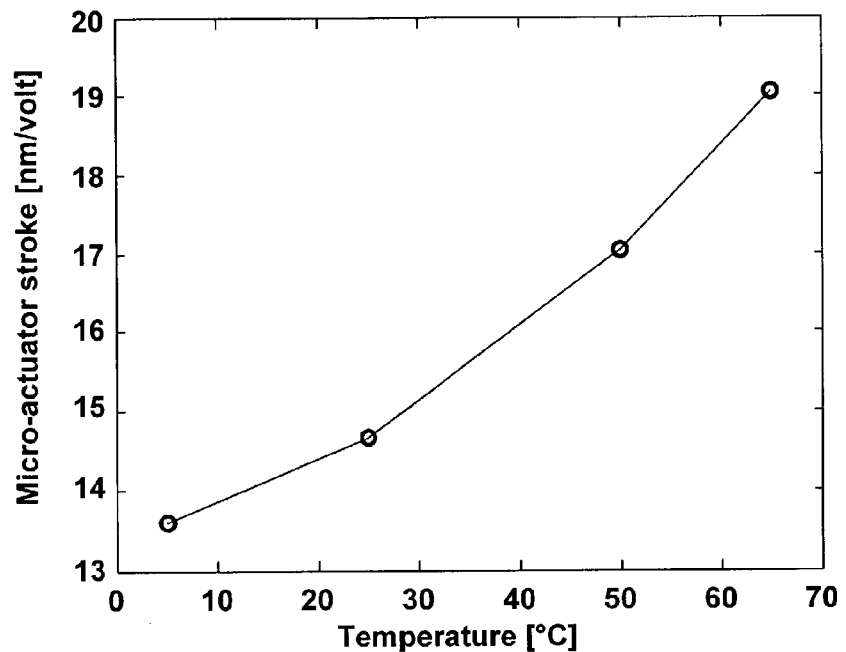
FIG. 3 is a plot showing the variation of micro-actuator stroke with temperature.

As mentioned above, the gain of the PZT system (micro-actuator) varies with temperature. FIG. 3, which is a plot of micro-actuator stroke in nanometers (nm)/volt along the vertical axis versus temperature in degrees Celsius (° C.) along the horizontal axis, shows that there is a substantial variation of micro-actuator stroke with temperature. Due to such variation in micro-actuator stroke with temperature, a micro-actuator gain variation of about 20–30% occurs during disc drive operation.

Figure 4:
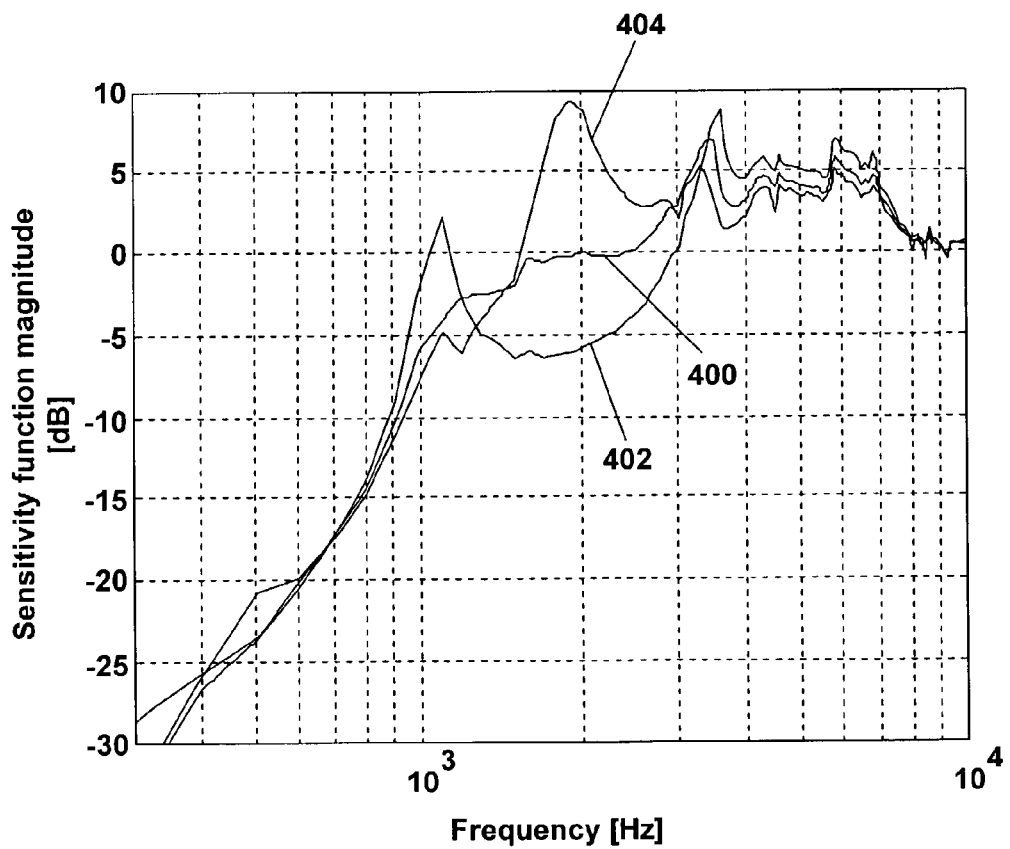
FIG. 4 is a graph showing plots of the disc drive servo loop sensitivity function for different values of micro-actuator gain.

Unlike the micro-actuator, which does not maintain a relatively constant gain when changes in temperature occur, the VCM maintains a substantially constant gain even when temperature fluctuates. Consequently, in a dual-stage control system, any major servo loop gain mismatch usually takes place due to PZT system (micro-actuator) gain variation. FIG. 4 shows plots of sensitivity functions (disturbance rejection functions) of a dual-stage servo loop with nominal (selected by design) PZT system gain (plot 400), +15% PZT system gain variation (plot 402) and −15% PZT gain variation (plot 404). Plots 400, 402 and 404 are obtained by plotting the gain of the servo loop sensitivity in decibels (dB) along the vertical axis versus frequency in Hertz (Hz) along the horizontal axis. Yin this example, the VCM loop and the micro-actuator loop cross at about 2000 Hz. If the micro-actuator and VCM loop gains are well tuned, they will cooperate in the 2000 Hz frequency range. If one of them is not set appropriately, the two loops may oppose each other and the resulting sensitivity function shape will change significantly. FIG. 4 indicates that the gain of the sensitivity function is about 0 dB at 2000 Hz when the micro-actuator gain is set at the nominal value (plot 400). When the micro-actuator gain increases by 15%, the sensitivity function gain at 2000 Hz decreases by 6 dB (plot 402). When the micro-actuator gain drops by 15, the sensitivity function gain at 2000 Hz increases by 9 dB (plot 404). This shows a clear relationship between micro-actuator gain variation and the closed-loop sensitivity function at the 2000 Hz frequency. The micro-actuator may be calibrated by maintaining the sensitivity function gain at 0 dB at the 2000 Hz frequency.

In general, variations in VCM and/or micro-actuator gain during disc drive operation may result in variations of servo loop bandwidth, gain and phase margin. Therefore, VCM and/or micro-actuator gain calibration is necessary to compensate for VCM and/or micro-actuator gain variation and to thereby maintain stability in the servo loop.

Under the present invention, stability in the disc drive servo loop is maintained by employing a real-time gain calibration technique that includes injecting a dither signal (a single frequency sine wave or a multi-frequency signal) into the servo loop and obtaining a servo loop gain error signal in response to the injected dither signal. A gain of the servo loop is adjusted as a function of the servo loop gain error signal. The gain of the servo loop may be adjusted by adjusting a gain of a micro-actuator in the servo loop, for example. Although embodiments of the present invention described below relate to micro-actuator gain adjustment or calibration, the same principles may be employed for VCM gain calibration or, in general, servo loop gain calibration.

Figure 5:
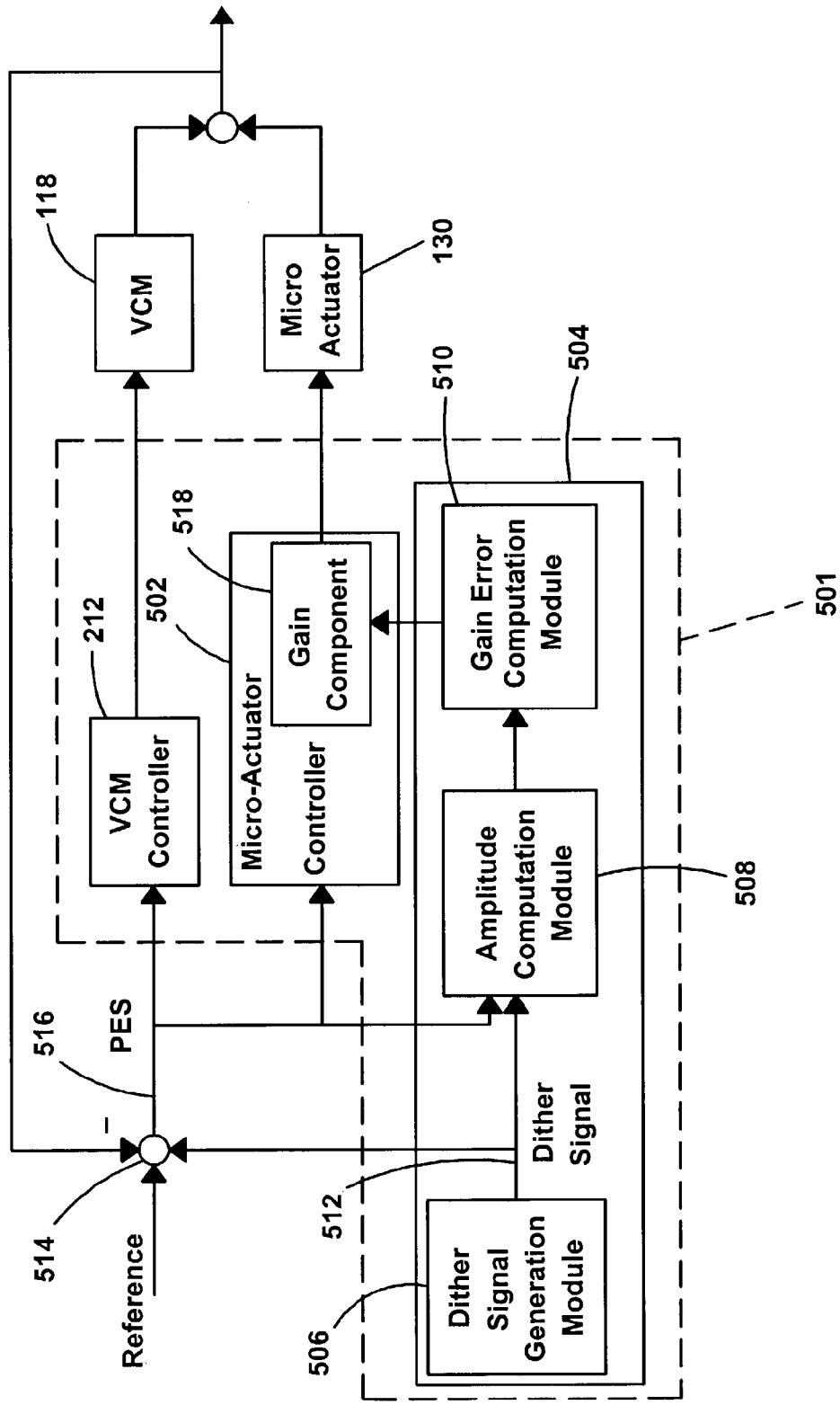
FIG. 5 is a block diagram of a disc drive servo loop with real-time gain calibration of the present invention.

Referring now to FIG. 5, a block diagram of a disc drive servo loop 500 that includes a gain calibration module 504 of the present invention is shown. Servo loop 500 includes a disc controller 501 which includes VCM controller 212, a micro-actuator controller 502 and gain calibration module 504. Other than disc controller 501, the remaining elements of servo loop 500 are substantially similar to the elements of servo loop 200 (FIG. 2). Gain calibration module 504, of disc controller 501, provides real-time adjustment of a gain of micro-actuator 130 to thereby maintain stability in servo loop 500. Module 504 carries out the micro-actuator gain calibration by injecting a dither signal into the servo loop, computing a servo loop gain error signal in response to the injected dither signal and adjusting the gain of the micro-actuator as a function of the servo loop gain error signal. To carry out these functions, gain calibration module 504 includes a dither signal generation module 506, an amplitude computation module 508 and a gain error computation module 510. As mentioned above, the dither signal can either be a single sine wave or a multi-frequency signal. Module 506 generates dither signal 512 using known techniques and provides generated dither signal 512 to summation node 514 (for introduction into PES 516) and to amplitude computation module 508. In addition to receiving dither signal 512, amplitude computation module 508 also receives PES 516 as an input. Amplitude computation module 508 computes an amplitude of PES 516 and an amplitude of dither signal 512 and provides these amplitude values to gain error computation module 510. Gain error computation module 510 computes a gain error in real-time as a function of the PES amplitude and the dither signal amplitude. Gain component 518 of micro-actuator controller 502 is adjusted as a function of the received gain error signal. As mentioned above, this gain calibration is carried out in real-time and therefore servo loop 500 functions optimally under different operating conditions. An example algorithm that can be used for PES and dither signal amplitude computation, servo loop gain error computation and micro-actuator gain adjustment is described below in connection with Equations 1 through 4.

The example algorithm employs a Discrete Fourier Transform (DFT) technique for calculating the PES amplitude and the dither signal amplitude. The DFT amplitude of the PES and the dither signal are expressed as:

$$y = \left\{\sum_{n=1}^{N} [PES(n) * d_{\sin}(n)]\right\}^2 + \left\{\sum_{n=1}^{N} [PES(n) * d_{\cos}(n)]\right\}^2 \quad \text{Equation (1)}$$

$$y_{target} = \left\{\sum_{n=1}^{N} [D_{\sin}(n) * d_{\sin}(n)]\right\}^2 + \left\{\sum_{n=1}^{N} [D_{\sin}(n) * d_{\cos}(n)]\right\}^2 \quad \text{Equation (2)}$$

where y is the norm square of the DFT of the PES, $y_{target}$ is the norm square of the DFT of the injected dither signal $D_{sin}(n)$, $d_{sin}(n)$ and $d_{cos}(n)$ are the sine and cosine waves at sample n, PES(n) is the position error signal at sample n and N is the number of DFT calculation points. The servo loop gain error signal (e) is defined as:

$$e = y_{target} - k*y \quad \text{Equation (3)}$$

where k>0 is the target bandwidth coefficient that adjusts the servo closed-loop gain at the selected dither signal frequency or calibration frequency f. The servo loop gain error signal is used to determine a real-time gain tuning equation, which is expressed as:

$$g(t) = g(t-1) + c*e \quad \text{Equation (4)}$$

where the positive constant coefficient c is a tuning gain factor that adjusts the speed of the adaptation. The initial value g(0) of the micro-actuator gain g(t) can be set based on off-line micro-actuator gain calibration, carried out during manufacture of the disc drive, for example. Equations (1) and (2) may be implemented in amplitude computation module 508 (FIG. 5), Equation (3) may be implemented in gain error computation module 510 (FIG. 5) and Equation (4) may be implemented in gain component 518 (FIG. 5).

The above real-time gain calibration algorithm has the following properties:

If e=0, no gain error is detected and therefore micro-actuator gain g(t) remains constant.

If e>0, the present servo loop gain is lower than the target gain and therefore micro-actuator gain g(t) will increase.

If e<0, the current loop gain is greater than the target gain and therefore micro-actuator gain g(t) will decrease.

Increasing the learning rate c speeds up the parameter convergence. However, a very large value of c may cause an amplification of noise which, in turn, can cause large servo bandwidth variation. In contrast, selecting a very small value of c may lead to a relatively slow learning speed. Taking into consideration the above constraints, the adaptation rate should be chosen based on the changing rate of the micro-actuator gain and drive temperature.

Values for the following parameters need to be appropriately selected for optimum performance of the above algorithm:

1) Calibration frequency or dither signal frequency f

The calibration frequency depends on the crossing frequency of the micro-actuator and VCM loops. It should be selected based on dual-stage controller design. An important criterion to choose this frequency is that the sensitivity function must be sensitive to the micro-actuator gain variation at the calibration frequency. The second concern of selecting the calibration frequency is the frequency location of system noise. Since the injected dither signal has a relatively small amplitude, to avoid servo performance degradation, it is preferable to inject the dither signal at a frequency where a low level of PES disturbances exists. This helps to increase the signal-to-noise ratio and obtain better calibration results.

2) Amplitude of the dither signal

To reduce the impact of the dither signal on the servo loop performance, the dither signal amplitude should be as small as possible. However, the smaller the dither signal, the smaller the signal-to-noise ratio. This may result in inaccurate micro-actuator calibration. A dither signal amplitude that is a fraction of track pitch (within about 0.2–0.4% of track pitch, for example) is sufficient to provide the necessary excitation while maintaining an acceptable servo performance.

3) Number of DFT calculation points N

In order to reduce the effect of system noise, the number of DFT points should be large. The updating rate of the calibration algorithm decreases when the number of DFT points increases. Since micro-actuator gain usually changes slowly with temperature, it is sufficient to update the micro-actuator gain every several seconds.

4) Target bandwidth coefficient k

As mentioned above, the coefficient k in Equation (3) adjusts the target dual-stage servo bandwidth. For example, if k=1, the target gain of the closed-loop sensitivity function will be $y_{target}/y=1$. This means that the gain of sensitivity function is 0 dB at calibration frequency f. If k=0.75, the desired gain of the sensitivity function is 2 dB at calibration frequency f. Normally, the calibration frequency f is chosen to have a value that is close to that of the servo bandwidth value because the servo loop bandwidth can be controlled by mantinaning the servo loop gain at the calibration frequency.

Figure 6:
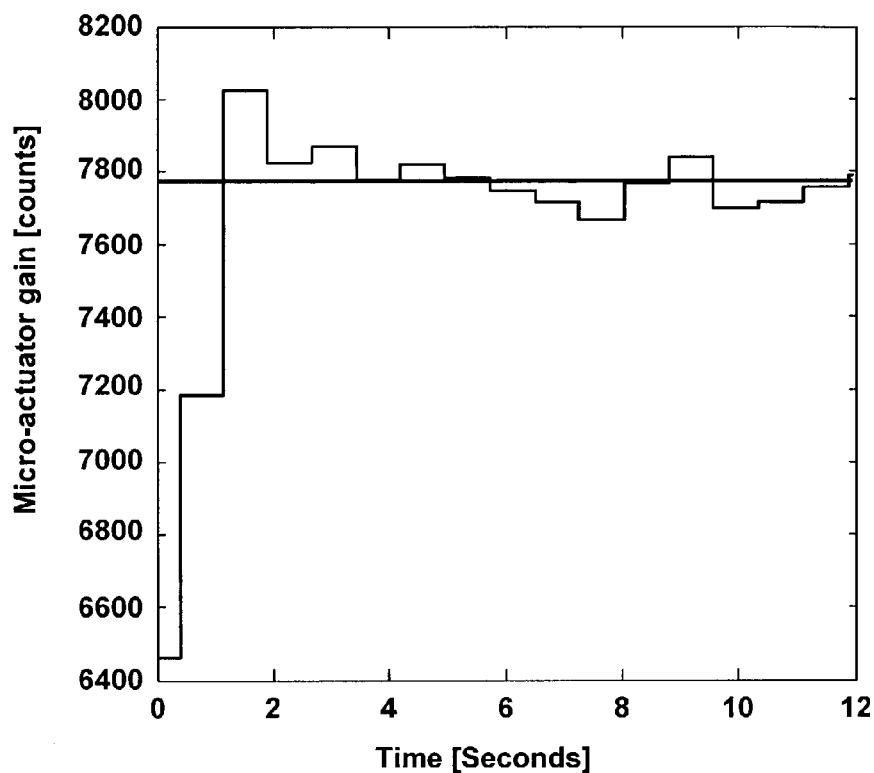
FIGS. 6 through 8 are plots illustrating results obtained by employing the real-time gain calibration technique of the present invention in a disc drive.
Figure 7:
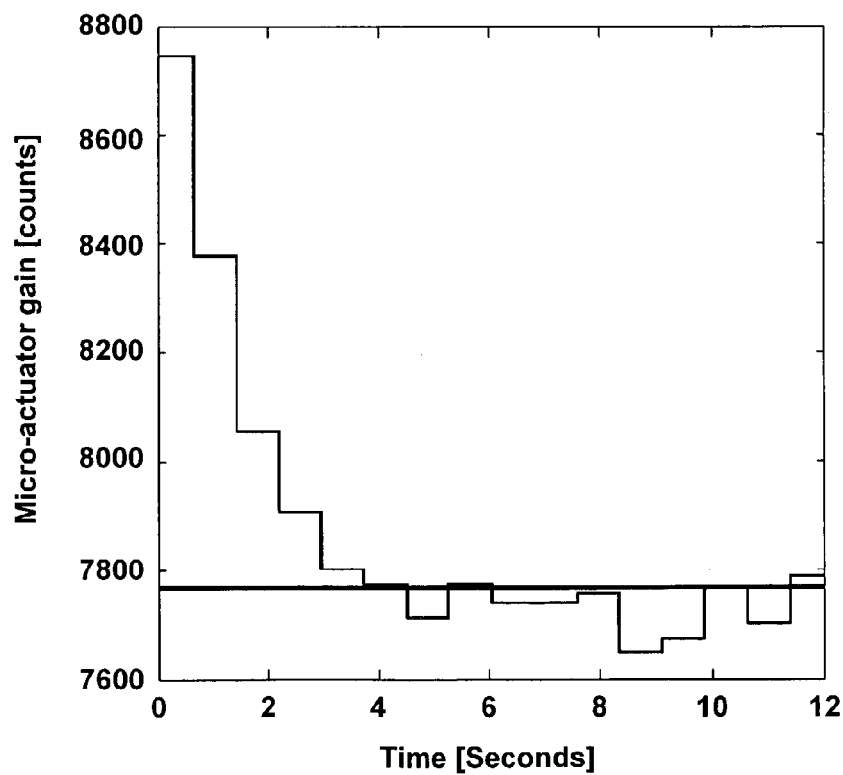

The above-described real-time gain calibration algorithm was implemented in a test disc drive. A 2080 Hz sine wave with +/−8 counts peak-to-peak amplitude (dither signal) was injected into the PES. The number of DFT points were 36864 (288 sectors×128 revolutions). The micro-actuator gain updating rate was selected as 0.768 seconds. FIG. 6 shows the convergence of the servo loop gain for a +15% micro-actuator gain variation and FIG. 7 shows the loop gain convergence for a −15% micro-actuator gain variation in the test disc drive. The plots of FIGS. 6 and 7 are obtained by plotting micro-actuator gain in counts along the vertical axis versus time in seconds along the horizontal axis. From FIGS. 6 and 7, it can be seen that the tuning algorithm takes 2–3 seconds to adjust the micro-actuator gain to the nominal value (value selected by design).

Figure 8:
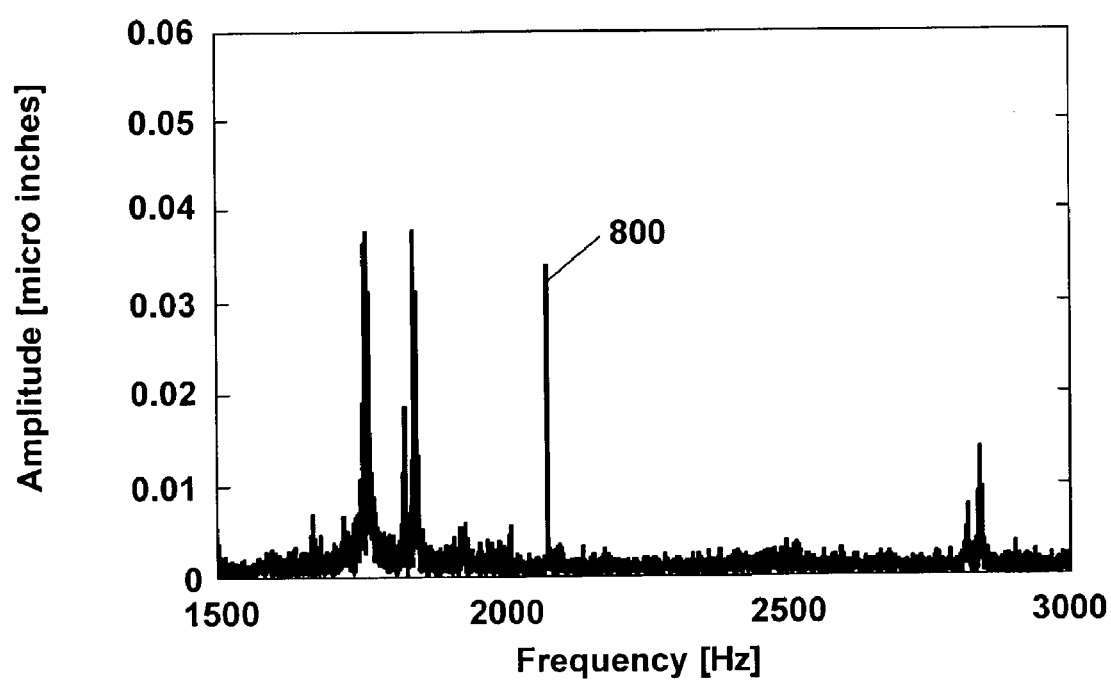

A non-repeatable run-out (NRRO) spectrum of the servo loop of the test disc drive is shown in FIG. 8. Usually, injecting the dither signal (designated by reference numeral 800 in FIG. 8) into the PES degrades NRRO performance. However, the test results in Table 1 below show that the NRRO performance is actually improved in this experiment. The NRRO performance improvement is due to the use of a more accurate micro-actuator gain that results from employing the real-time gain calibration of the present invention.

TABLE 1

| NRRO Performance | Mean (micro inch) | Mean + 3 sigma (micro inch) | Z-score |
|---|---|---|---|
| Without micro-actuator gain calibration | 0.59 | 0.89 | 5.1 |
| With micro-actuator gain calibration | 0.6 | 0.88 | 5.3 |

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to real-time micro-actuator gain calibration in a servomechanism of a disc drive storage system, it will be appreciated by those skilled in the art that the teachings of the present invention can be applied to other control systems, without departing from the scope and spirit of the present invention. Further, the gain calibration process may be implemented in hardware or software. Gain calibration module 504 may be a part of controller 501, as described above, or may be separate from controller 501. The disc drive can be based upon magnetic, optical, or other storage technologies and may or may not employ a flying slider.

What is claimed is:

1. A method comprising:
   combining a preselected dither signal with a desired position input signal and an actual position feedback signal to define a position error signal in a servo loop;
   comparing the dither signal and the position error signal; and
   adjusting a gain of the servo loop in response to the comparing step.

2. The method of claim 1 wherein the adjusting step comprises adjusting a gain of a micro-actuator in real-time.

3. The method of claim 2 wherein the micro-actuator is a piezoelectric micro-actuator.

4. The method of claim 1 wherein the adjusting step further comprises computing a servo loop gain error signal using a Discrete Fourier Transform (DFT).

5. The method of claim 4 wherein the computing step further comprises calculating a difference between a DFT amplitude of the position error signal and a DFT amplitude of the dither signal.

6. The method of claim 1 wherein the dither signal is a single frequency sine wave.

7. The method of claim 1 wherein the dither signal is a multi-frequency signal.

8. The method of claim 1 wherein an amplitude of the dither signal is a fraction of track pitch.

9. The method of claim 8 wherein the amplitude of the dither signal is 0.2–0.4% of track pitch.

10. The method of claim 1 further comprising selecting a frequency of the dither signal based upon a level of position error signal disturbance.

11. A circuit comprising a servo loop configured to combine a preselected dither signal with a desired position input signal and an actual position feedback signal to define a position error signal and to compare the dither signal with the position error signal to adjust a servo loop gain.

12. The circuit of claim 11 further configured to adjust the servo loop gain by adjusting a gain of a micro-actuator.

13. The circuit of claim 12 wherein the micro-actuator is a piezoelectric micro-actuator.

14. The circuit of claim 11 further configured to obtain a servo loop gain error signal from comparing the dither signal with the position error signal by computing a Discrete Fourier Transform (DFT).

15. The circuit of claim 14 further configured to compute the servo loop gain error signal by calculating a difference between a DFT amplitude of the position error signal and a DFT amplitude of the dither signal.

16. The circuit of claim 11 wherein the dither signal is a single frequency sine wave.

17. The circuit of claim 11 wherein the dither signal is a multi-frequency signal.

18. The circuit of claim 11 wherein an amplitude of the dither signal is a fraction of track pitch.

19. The circuit of claim 18 wherein the amplitude of the dither signal is 0.2–0.4% of track pitch.

20. A disc drive for storing information on a disc, the disc drive comprising:
   an actuator assembly for positioning a head over the disc; and
   a gain calibration means, in a servo loop that includes the actuator assembly, for providing a real-time calibration of a gain of the servo loop.

* * * * *